United States Patent [19]

Rocco et al.

[11] Patent Number: 5,031,043

[45] Date of Patent: Jul. 9, 1991

[54] VIDEO SIGNAL SELECTION MEANS FOR TRANSMITTING SIGNAL AND KEY INFORMATION OVER A SIGNAL CHANNEL

[75] Inventors: Alfred J. Rocco, East Stroudsburg, Pa.; Thomas T. Milam, Nevada City, Calif.

[73] Assignee: The Grass Valley Group, Inc., Nevada, Calif.

[21] Appl. No.: 489,291

[22] Filed: Mar. 5, 1990

[51] Int. Cl.5 .................. H04N 5/262; H04N 5/265; H04N 5/272
[52] U.S. Cl. ............................. 358/181; 358/22; 358/183
[58] Field of Search ............. 358/22, 22 PIP, 181, 358/183, 185

[56] References Cited

U.S. PATENT DOCUMENTS

| | | | |
|---|---|---|---|
| 4,392,156 | 7/1983 | Duca | 358/183 |
| 4,689,681 | 8/1987 | Jackson | 358/183 |
| 4,827,251 | 5/1989 | Aoki | 358/22 |
| 4,887,159 | 12/1989 | Chaplin | 358/181 |
| 4,963,977 | 10/1990 | Jackson et al. | 358/22 |

Primary Examiner—Tommy P. Chin
Attorney, Agent, or Firm—John Smith-Hill

[57] ABSTRACT

A video signal is processed in response to a key signal by selecting the video signal when the value of the key signal is within a first range and selecting a second signal when the value of the key signal is within a second range that excludes the first range. The amplitude of the second signal is outside the range of a video signal throughout the active picture interval.

20 Claims, 2 Drawing Sheets

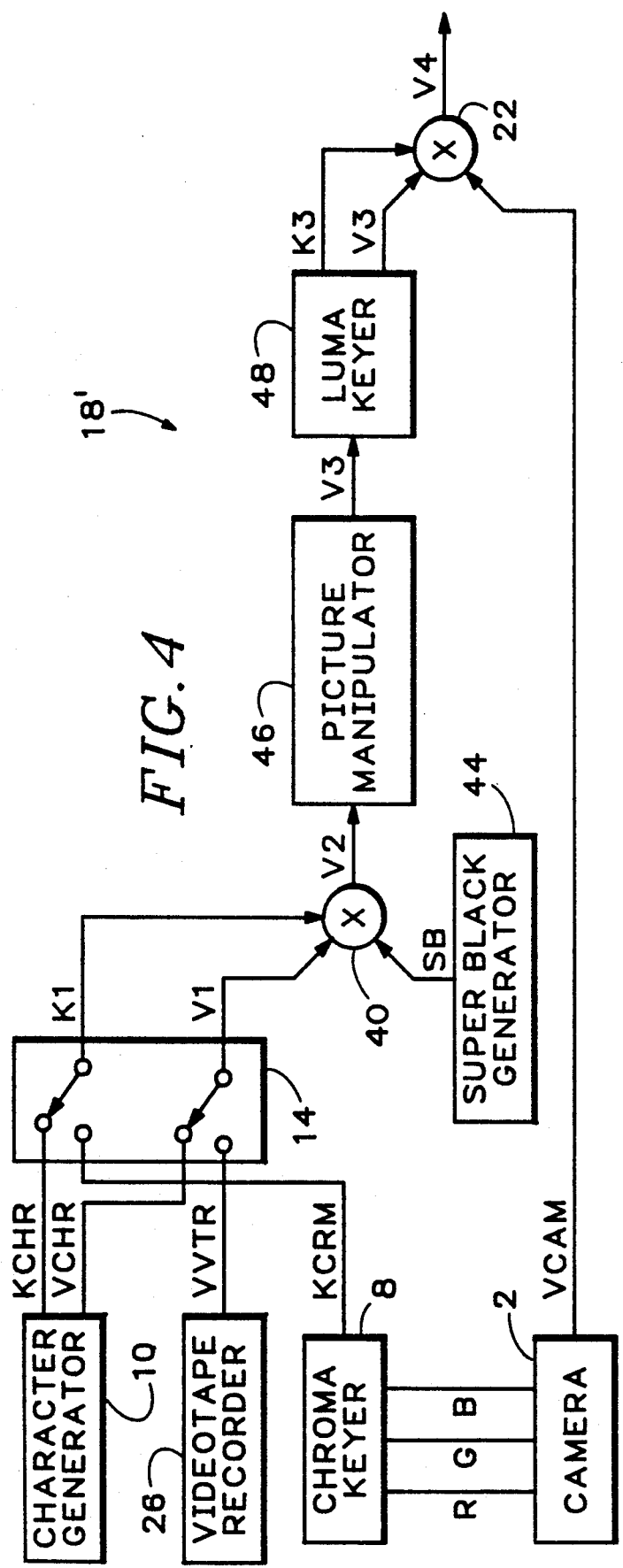
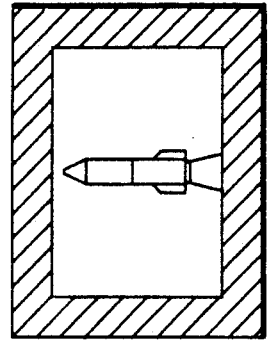
FIG. 5D
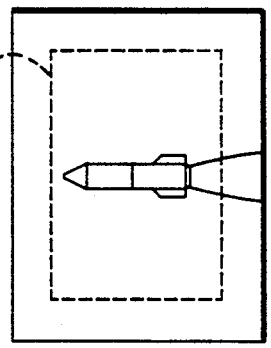
FIG. 5C
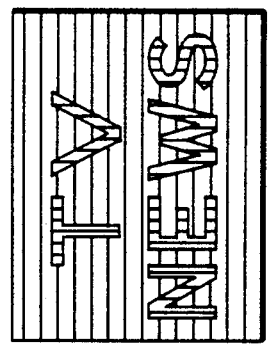
FIG. 5B
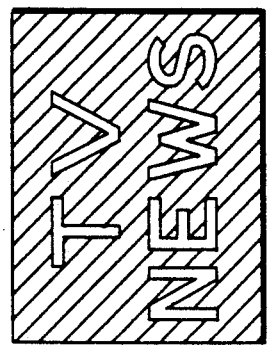
FIG. 5A

VIDEO SIGNAL SELECTION MEANS FOR TRANSMITTING SIGNAL AND KEY INFORMATION OVER A SIGNAL CHANNEL

BACKGROUND OF THE INVENTION

This invention relates to a method and apparatus for processing a video signal.

FIG. 1 illustrates in block form a typical arrangement of video production equipment. In production of a television news program, a camera 2 provides a full-field video signal VCAM representing a picture of a news reader 4 (FIG. 2A) against a background 6. A chroma keyer 8 generates a chroma key signal KCRM that defines an area of picture that has a particular color, such as a saturated blue. Signal KCRM is high for points that are the selected color and is low for points that are not the selected color. Typically, the only portion of the picture that is the selected color is a panel 12 of background 6.

A character generator 10 provides a full-field video signal VCHR representing a picture of a caption containing the title of the program (FIG. 2B), and an accompanying key signal KCHR that defines the boundaries of the characters. The key signal is high for points within the outlines of the characters shown in FIG. 2B and is low for points outside those outlines. Video signal VCHR and key signal KCHR are selected by a switcher 14 and applied to a digital video effects device 18, which spatially transforms the picture (compresses and translates it). For example, the operator might cause device 18 to compress the picture to the size of panel 12 and position it in the same location of the raster as panel 12. Device 18 processes key signal KCHR in essentially the same fashion as it processes video signal VCHR. The fill video signal VFIL provided by device 18 is combined with the camera signal VCAM in a multiplier 22 that operates under control of the compressed and translated key signal KFIL. In this fashion, a video signal VOUT representing the picture shown in FIG. 2C is generated at the output of the multiplier.

It is conventional to cut from the picture of the news reader to a target picture having some relevance to the events to which the news reader is referring, for example a picture illustrating launch of a spacecraft as shown in FIG. 2D. In order to provide a smooth transition from one picture to the other, the target picture may be shown briefly in the panel area of the background in place of the caption (FIG. 2E). The target picture is represented by a video signal VVTR provided by a videotape recorder 26. Switcher 14 selects video signal VVTR and key signal KCRM. Device 18 compresses and translates the picture represented by signal VVTR to fit it in the area defined by key signal KCRM, and the picture represented by the video signal VVTR appears in the panel area of the background. Video effects device 18 then expands the combined picture and shifts it so that the picture represented by the video signal VVTR occupies the entire raster.

In order to accomplish the effects that have been described above, it is necessary that digital video effects device 18 have two digital processing channels. One channel processes the video signal and the other processes the key signal.

The Grass Valley Group DPM 100 Digital Video Effects Generator can be used to carry out spatial transformation of a picture represented by a video signal. The main functional blocks of the DPM 100 device include a luminance keyer 32, i.e., a keyer that generates a key signal in dependence on the level of the video signal received by the keyer, and a digital picture manipulator 34, arranged as shown in FIG. 3. The simplest form of the DPM 100 device has a siggle digital processing channel and is designed to receive a video signal but no key signal, the key signal to accompany the output video signal being provided by luminance keyer 32. Where a substantial difference in luminance levels exists between, for example, foreground and background portions of the picture, a luminance keyer may be entirely satisfactory. However, if luminance keyer 32 of the DPM 100 device received the signal VCHR provided by character generator 10, the key signal generated by the luminance keyer might not define clearly the boundaries of the characters because there might not be a significant difference between the luminance level of the characters and the luminance level of the background. Accordingly, the DPM 100 device cannot be used as the digital video effects device 18 in the arrangement shown in FIG. 1.

SUMMARY OF THE INVENTION

In accordance with a first aspect of the invention, apparatus for processing a video signal having a selected range of amplitudes within the active picture interval comprises a source of a second signal of which the amplitude is outside the selected range throughout the active picture interval, a source of a key signal, and selector means responsive to the key signal to select the video signal when the value of the key signal is within a first range and to select the second signal when the value of the key signal is within a second range that excludes the first range.

In accordance with a second aspect of the invention, video production apparatus comprises a source of a video signal having a selected range of amplitudes within the active picture interval, a source of a second signal of which the amplitude is outside said selected range throughout the active picture interval, a source of a key signal, and selector means responsive to the key signal to select the video signal when the value of the key signal is within a first range and to select the second signal when the value of the key signal is within a second range that excludes the first range.

In accordance with a third aspect of the invention, a video signal that has a selected range of amplitudes within the active picture interval is processed by generating a second signal of which the amplitude is outside the selected range throughout the active picture interval and also generating a key signal and outputting the video signal when the value of the key signal is within a first range and outputting the second signal when the value of the key signal is within a second range that excludes the first range.

BRIEF DESCRIPTION OF THE DRAWINGS

For a better understanding of the invention, and to show how the same may be carried into effect, reference will now be made, by way of example, to the accompanying drawings in which:

FIG. 4 is a schematic block diagram showing an arrangement of video production equipment in accordance with the present invention; and FIGS. 5A–5D represent signals that typically occur in use of the arrangement shown in FIG. 4.

In the different figures, like reference numerals designate like components and primed reference numerals designate components that have similar functions to those represented by the corresponding unprimed reference numerals.

DETAILED DESCRIPTION

Figure 1:
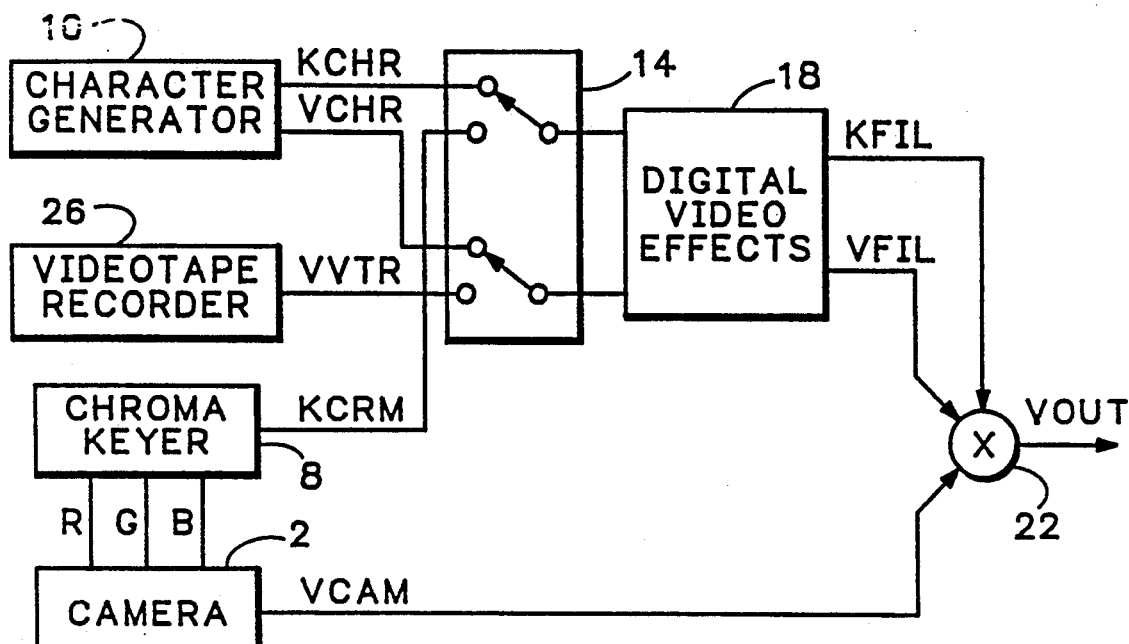
FIG. 1 is a schematic block diagram forming a typical arrangement of video production equipment.
Figure 2A:
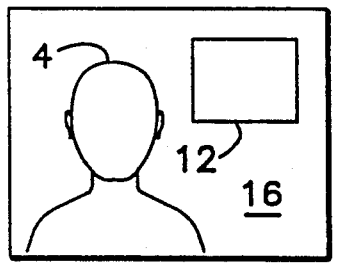
FIGS. 2A-2E show pictures of a type that typically occur in production of a television news program.
Figure 2B:
Figure 2C:
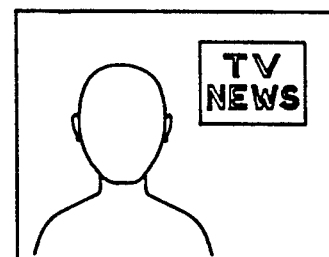
Figure 2D:
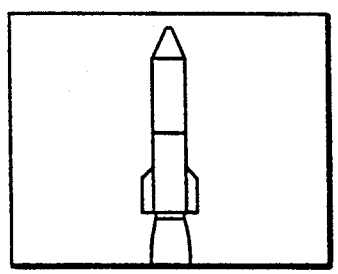
Figure 2E:
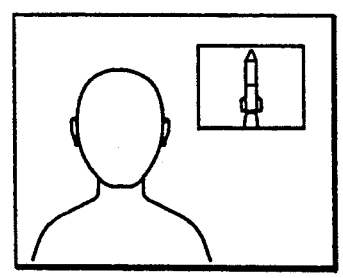
Figure 3:
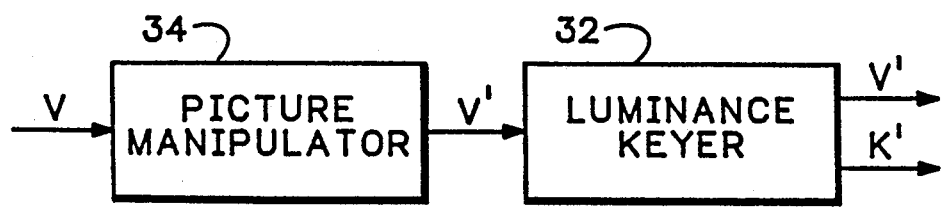
FIG. 3 is a schematic block diagram of a luminance digital video effects device.

The apparatus shown in FIG. 4 comprises a multiplier 40 that receives three full-field signals, namely a video signal V1 and a key signal K1 from switcher 14, and a super-black signal SB from a signal generator 44. The three signals are synchronized, and each includes a blanking interval and an active picture interval. In accordance with the NTSC standard, the level of signal V1 during the active picture interval is in the range from +4 IRE to +120 IRE. The signal SB is at a constant level throughout the active picture interval, and this level is selected so that it is below the range of a video signal during the active picture interval and is above the range of levels to which a sync separator responds. The signal SB is typically fixed at 0 IRE units throughout the active picture interval. The key signal K1 is used to distinguish first and second areas of the video field. The key signal is high at points within the first area and is low at points within the second area. In the event that switcher 14 selects character generator 10, the key signal defines the boundaries of the characters shown, for example, in FIG. 2B.

The key signal K1 controls operation of multiplier 40 such that the output signal V2 of multiplier 40 is the signal V1 for points within the aforesaid first area of the field and is the signal SB for points within the second area. Accordingly, for the signals represented by FIG. 2, the signal V2 may be represented by FIG. 5A, where the diagonal shading corresponds to super-black. Thus, signal V2 contains both video information and key information.

Full-field video signal V2 is applied, without accompanying key, to a digital video effects device 18', which includes a picture manipulator 46 and a luminance keyer 48. Picture manipulator 46 carries out a spatial transformation operation on video signal V2 to produce a video signal V3. The transformation may include a change of scale (expansion or compression), a translation, a rotation, or a combination of these. Since the key information is present in video signal V2, video signal V3 contains transformed key information. Video signal V3 is applied to luminance keyer 48. The keyer 48 passes video signal V3 unchanged and generates a key signal K3 in response to the luminance level of the video signal. The range of levels to which the luminance keyer can respond is included in the range of levels that the video signal V3 may have within the active picture interval, i.e., the key level is within the range from +4 IRE units to +120 IRE units. Consequently, key signal K3 is low for all points corresponding to the second area defined by the key signal K1, and with appropriate selection of the key level, signal K3 is high for all points corresponding to the first area defined by key signal K1. In this fashion, the key information present in signal V3 is retrieved. The signal K3 may be represented by FIG. 5B, where vertical shading represents a high value and horizontal shading a low value. Video signal V3 and key signal K3 are applied to multiplier 22, which combines video signals VCAM and V3 under control of key signal K3 to produce an output video signal V4.

Since signal V2 contains both video information and key information, picture manipulator 46 requires only a single digital processing channel to transform both video information and key information. Therefore, effects device 18' may be implemented by the DPM 100 device.

In the event that switch 14 selects VTR 26, the key signal K1 would typically define a rectangular boundary. This might correspond with panel 12. However, the key signal that is utilized when switcher 14 selects VTR 26 need not be provided by chroma keyer 8, but could be derived from another source, so that the size and position of the boundary is under operator control. The rectangular boundary may coincide with the boundary of the active picture area, in which case the signal V2 is the same as the signal V1 and luminance keyer 48 is set so that the key level is just below the normal range of video amplitudes. Consequently, signal K3 is high for the entire active picture area. If, on the other hand, key signal K1 defines an area smaller than the active picture area of signal V1, for example as shown by the boundary 54 in FIG. 5C, then signal V2 is the same as signal V1 for points inside that boundary and is super-black for points outside that area, as shown in FIG. 5D. Key signal K3 then defines the same boundary as key signal K1.

It will be appreciated that the invention is not restricted to the particular embodiment that has been described, and that variations may be made therein without departing from the scope of the invention as defined in the appended claims and equivalents thereof. For example, the invention is not restricted to the keyer of the external device being a luminance keyer but it may in general be any keyer that operates in response to a characteristic of the video signal during the active picture interval.

We claim:

1. Apparatus for processing a video signal having a selected range of amplitudes within the active picture interval, comprising:
   a source of a second signal of which the amplitude is outside said selected range throughout the active picture interval,
   a source of a key signal, and
   selector means responsive to the key signal to select the video signal when the value of the key signal is within a first range and to select the second signal when the value of the key signal is within a second range that excludes the first range.

2. Apparatus according to claim 1, wherein the selector means comprise a multiplier.

3. Apparatus according to claim 1, further comprising manipulator means for spatially transforming the signal provided by the selector means.

4. Apparatus according to claim 3, further comprising a keyer for receiving the signal provided by the manipulator means and generating a second key signal in response thereto, the keyer being responsive to the level of the signal provided by the manipulator means.

5. Apparatus according to claim 4, wherein the keyer is a luminance keyer.

6. Apparatus according to claim 4, further comprising combiner means for combining the signal provided by the manipulator means with a further video signal in accordance with the value of the second key signal.

7. Apparatus according to claim 6, wherein the combiner means comprise a multiplier responsive to the second key signal to select the signal provided by the manipulator means when the value of the second key signal is within a first range of values of the second key signal and to select the further video signal when the value of the second key signal is within a second range of values of the second key signal, said second range of values of the second key signal excluding said first range of values of the second key signal.

8. Video production apparatus comprising:
a source of a video signal having a selected range of amplitudes within the active picture interval,
a source of a second signal of which the amplitude is outside said selected range throughout the active picture interval,
a source of a key signal, and
selector means responsive to the key signal to select the video signal when the value of the key signal is within a first range and to select the second signal when the value of the key signal is within a second range that excludes the first range.

9. Apparatus according to claim 8, wherein the source of the video signal comprises at least two video signal sources and a switcher operative to select any one f the video signal sources.

10. Apparatus according to claim 8, further comprising manipulator means for spatially transforming the signal provided by the selector means.

11. Apparatus according to claim 10, further comprising a keyer for receiving the signal provided by the manipulator means and generating a second key signal in response thereto, the keyer being responsive to the level of the signal provided by the manipulator means.

12. Apparatus according to claim 11, wherein the keyer is a luminance keyer.

13. Apparatus according to claim 12, wherein the source of the video signal is a character generator.

14. Apparatus according to claim 11, further comprising combiner means for combining the signal provided by the manipulator means with a further video signal in accordance with the value of the second key signal.

15. Apparatus according to claim 14, wherein the combiner means comprise a multiplier responsive to the second key signal to select the signal provided by the manipulator means when the value of the second key signal is within a first range of values of the second key signal and to select the further video signal when the value of the second key signal is within a second range of values of the second key signal, said second range of values of the second key signal excluding said first range of values of the second key signal.

16. A method of processing a video signal having a selected range of amplitudes within the active picture interval to provide an output signal, said method comprising:
generating a second signal of which the amplitude is outside said selected range throughout the active picture interval,
generating a key signal, and
selecting the video signal as said output signal when the value of the key signal is within a first range and selecting the second signal as said output signal when the value of the key signal is within a second range that excludes the first range.

17. A method according to claim 16, further comprising spatially transforming the output signal.

18. A method according to claim 11, further comprising receiving the transformed output signal and generating a second key signal in response to the level of the transformed output signal.

19. A method according to claim 18, further comprising combining the transformed output signal with a further video signal in accordance with the value of the second key signal.

20. A method of generating a video signal, comprising:
employing a character generator to generate a first video signal having a selected range of amplitudes within the active picture interval,
generating a second signal of which the amplitude is outside said selected range throughout the active picture interval,
generating a first key signal,
selecting the first video signal as an output signal when the value of the first key signal is within a first range and selecting the second signal as an output signal when the value of the first key signal is within a second range that excludes the first range,
applying the output signal to a key generator that is responsive to the level of the signal received thereby, the key generator generating a second key signal having a first level when said output signal is within said second range and having a second level when said output signal is within said first range, and
combining said output signal with a further video signal in accordance with the value of the second key signal.

* * * * *